W. H. CLIFFORD.
FLEXIBLE SHAFT COUPLING.
APPLICATION FILED NOV. 28, 1919.
1,386,161.
Patented Aug. 2, 1921.
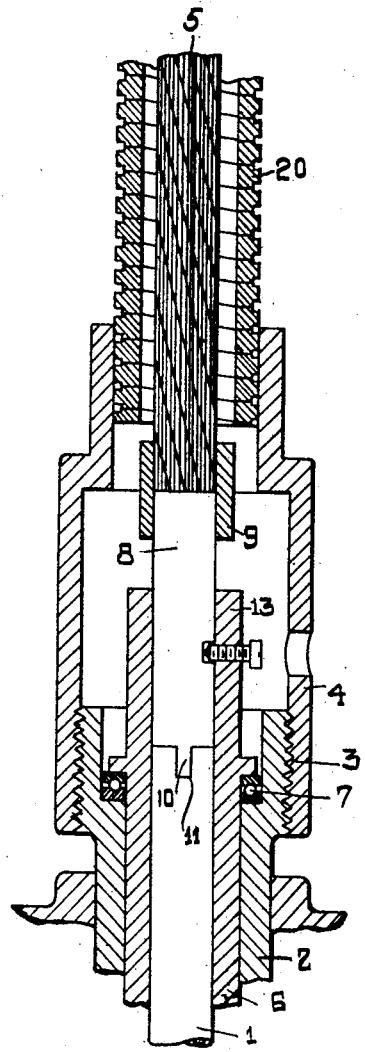
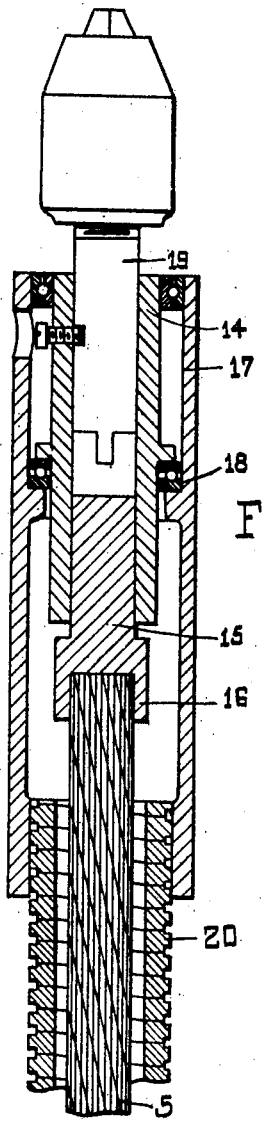
Fig: 1
Fig: 2
Inventor
William Hugh Clifford
(Lord Clifford of Chudleigh)
per Arthur J. Stephens
Attorney

UNITED STATES PATENT OFFICE.

WILLIAM HUGH CLIFFORD, OF EALING, LONDON, ENGLAND.

FLEXIBLE SHAFT-COUPLING.

1,386,161.  Specification of Letters Patent.  Patented Aug. 2, 1921.

Application filed November 28, 1919. Serial No. 341,184.

*To all whom it may concern:*

Be it known that I, WILLIAM HUGH CLIFFORD, (Lord Clifford of Chudleigh,) a subject of the King of Great Britain and Ireland, residing at 67 Madeley road, Ealing, London, England, have invented new and useful Improvements in and Relating to Flexible Shaft-Couplings, of which the following is a specification.

This invention relates to flexible shafting and couplings—the essential feature being that the size and form of the coupling that is fitted to hold the tools in the shafting corresponds with the size and form of the coupling of the motor or driving machine to which the shafting is to be coupled so that tools that fit the coupling of the motor or driving machine will also fit the coupling at the end of the flexible shaft.

The present invention comprises couplings for the machine and for the flexible shaft in which a sleeve is secured to the driving shaft of the machine and mounted in ball bearings in an outer sleeve at the end of the driving shaft and a corresponding sleeve is mounted in ball bearings in an outer sleeve at the end of the flexible shaft, said sleeves being adapted to receive and to form a coupling for the tail piece of the flexible shaft or for the tail piece of a tool. The arrangement of ball bearings secures the reduction of friction to a minimum.

My invention is illustrated by way of example in the accompanying drawings, in which:—

Figure 1 shows a sectional view of the machine coupling with a flexible shaft in position, and Fig. 2 shows a sectional view of the shaft coupling with a tool in position.

Referring now to the drawings the shaft 1 of the driving machine has a sleeve 6 projecting from the bearing 2. This bearing has a screw thread 3 on its outer surface by which the tube 4 to which the flexible outer covering 20 of the flexible shaft 5 is attached. The sleeve 6 is provided with a ball thrust 7 where it bears against the bearing 2. A tail piece or short shaft 8 is fixed by means of a sleeve 9 to the end of the flexible shaft 5. This short shaft 8 is provided with a cross driving member 10 adapted to engage in a corresponding slot 11 in the motor shaft 1 of the machine. The said short shaft 8 and motor shaft 1 are adapted to fit exactly into the interior of the sleeve 6. A set screw 13 in the wall of the sleeve 6 retains the short shaft in position with its driving member 10 in engagement with the end of the motor shaft 1 when the flexible shaft is coupled to the machine. The drive from the shaft 1 is transmitted to the flexible shaft through the sleeve 6.

The tail piece of the chuck or other tool intended to be driven from the machine is made of exactly the same form as the short shaft, so that when it is desired to dispense with the flexible shaft the chuck or other tool can be fitted into the projecting sleeve 6 of the machine.

The outer coupling or tool holder of the flexible shaft 5 is similar in form and dimensions to the projecting sleeve 6. The said sleeve tool holder 14 of the flexible shaft coupling is driven by means of a short shaft 15 attached to the outer end of the flexible shaft as shown in Fig. 2, by a small sleeve 16. The flexible outer cover 20 of the shaft 5 has attached to it a handle 17 of tubular form. This tubular handle may be roughened to provide a better grip for the operator. The interior of this tubular handle 17 is provided with ball thrust bearings 18 adapted to take the end thrust when axial pressure is put on the tool 19 and consequently on the said sleeve tool holder 14.

What I claim is:—

1. Shaft and tool couplings for motor driving machines and flexible shafts comprising a driving machine, a driving shaft, a flexible shaft, a sleeve at the end of said driving shaft adapted to receive the tail piece of a tool or the tail piece of the flexible shaft, an outer sleeve secured to said driving shaft and surrounding said tool sleeve, ball bearings between said outer and inner driving shaft sleeves, a sleeve attached to the end of said flexible shaft corresponding in form and size with the tool or flexible shaft sleeve at the end of the driving shaft, an outer sleeve secured to said flexible shaft and surrounding said tool sleeve and ball bearings between said flexible shaft sleeves.

2. Shaft and tool couplings for motor driving machines and flexible shafts comprising a driving machine, a driving shaft, a flexible shaft, a sleeve at the end of said driving shaft adapted to receive the tail piece of a tool or the tail piece of the flexible shaft, an outer sleeve secured to said driving shaft and surrounding said tool sleeve, ball thrust bearings between said outer and inner driving shaft sleeves, a screw thread on said outer sleeve, a tube attached to the outer covering of the flexible shaft at one end and adapted to be screwed over said outer sleeve, a sleeve attached to the end of the flexible shaft corresponding in form and size with the tool or flexible shaft sleeve at the end of the driving shaft, an outer sleeve secured to the outer cover of the flexible shaft and surrounding said tool sleeve and ball thrust bearings between said flexible shaft sleeves.

In testimony whereof I have signed my name to this specification.

CLIFFORD.